Nov. 17, 1931.  E. SCHILKE  1,832,326
DIRECTION INDICATING DEVICE
Filed June 30, 1926
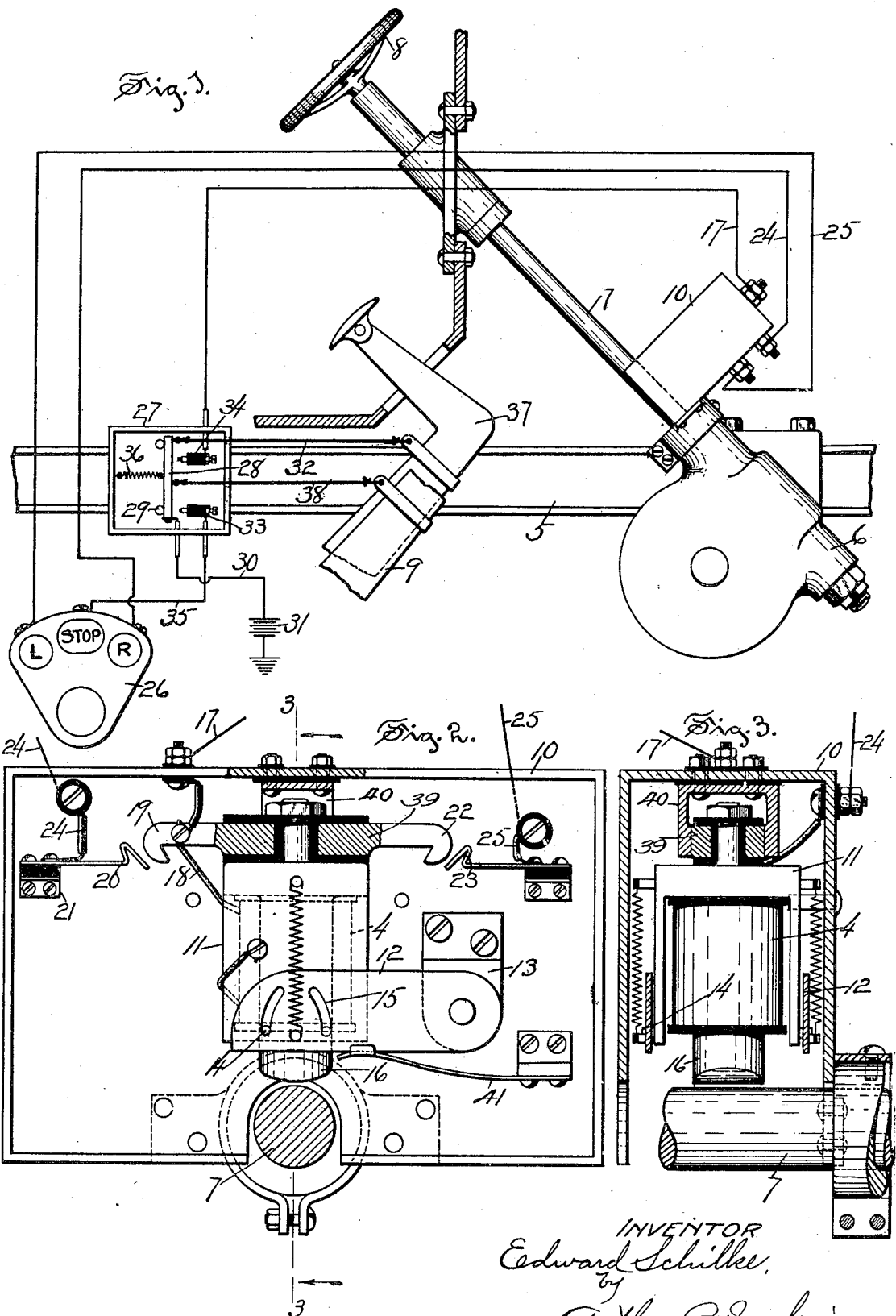
INVENTOR
Edward Schilke,
by
Arthur B Jenkins
ATTORNEY Patented Nov. 17, 1931

1,832,326

UNITED STATES PATENT OFFICE

EDWARD SCHILKE, OF MIDDLETOWN, CONNECTICUT

DIRECTION INDICATING DEVICE

Application filed June 30, 1926. Serial No. 119,604.

My invention relates to that class of devices employed upon automobiles or similar vehicles for indicating an intended purpose of the driver, as to turning, the direction of turning movement, and to stop, and an object of my invention, among others, is the production of a device of this class that shall be automatic in its action and one that shall be particularly efficient in its method of operation.

One form of device embodying my invention and in the construction and use of which the objects herein set out, as well as others, may be attained, is illustrated in the accompanying drawings, in which—

Figure 1 is a diagrammatic view, illustrating in side elevation a portion of the steering and braking mechanism of an automobile.

Figure 2 is a detail view, scale enlarged, showing the interior of the case for the controller mechanism, and with parts broken away to show construction.

Figure 3 is a view in section on a plane denoted by the dotted line 3—3 of Figure 2.

In the accompanying drawings the numeral 5 indicates a side bar of the frame of a motor vehicle, 6 the gear casing for steering mechanism, 7 the steering pillar or shaft, 8 the steering wheel, and 9 the brake lever of an automobile, all of which parts may be of ordinary and common construction.

The controller mechanism is located in a controller box 10 supported in operative position with respect to the shaft 7, said shaft in fact passing through one edge of the box, and as shown in Figure 2 of the drawings. A direction controller is mounted within the box 10, this controller being in the form of a magnet 4 secured to a frame 11 movably supported on a controller carrier 12 pivotally supported by a bracket 13 secured to the side of the box. The controller including the frame 11 has guide pins 14 projecting through guide slots 15 in the carrier 12, this carrier being forked to receive said controller between its branches.

The armature or core of the magnet constitutes an actuator 16 that, by contact with the shaft or steering pillar 7 actuates the controller by swinging it and also imparting a tipping movement thereto.

This is effected as by means of an electric circuit comprising a main wire 17 extending from a suitable source of electric energy and connected up in a manner to be hereinafter described, this wire leading by a connection 18 to one pole of the magnet and the other pole of said magnet being grounded on the frame of the vehicle. From this it will be seen that when the magnet is energized by flow of current introduced by the wires 17 and 18, the actuator 16 will be attracted to the shaft 7, said actuator adhering to the shaft in a manner that will be readily understood. A turning movement of the shaft under these conditions will cause the controller to be rocked upon one of the pins 14, as a fulcrum, the direction of rocking movement depending upon which way the shaft 7 is turned. If the shaft 7 be turned to the right the controller 16, as to its upper end, will be rocked to the left on the pin 14 located at the left, as shown in Figure 2, causing the frame 11 and support 39 carried thereby to be rocked, thereby causing a hook 19 on the controller to engage a spring latch 20 secured to a support 21 on the box 10, and if the shaft 7 be turned to the left, the controller, as to its upper end, will be swung to the right rocking on the pin 14 located at the right as shown in Figure 2, thereby causing a hook 22 to engage a spring latch 23 mounted on a support similar to that just hereinbefore described. The hooks 19 and 22 extend from opposite sides of a controller support 39 mounted upon and carried by the movable operator or frame 11, said support being movably mounted between the side parts of a bracket 40 secured to a wall of the box 10, and as shown in Figures 2 and 3 of the drawings. The latches 20 and 23 are connected by means of wires 24—25 with a lighting device in an indicator case 26. Said hooks are disengaged from the latches by means of a spring or springs 41 pressing upwardly against the under edge of the side parts of the controller carrier 12, and as shown in Figure 2, the strength of the spring, however, not being sufficient to overcome the magnetic force and disengage the actuator 16 from the shaft 7.

From this it will be seen that when the hook 19 is engaged with the latch 20, as by turning the shaft 7 to the right, electric current traversing the wire 24 will illuminate the light marked "R", it, of course, being understood, that the circuit is complete, mechanism for completing the circuit to be hereinafter described. When the shaft 7 is turned to the left the hook 22 will be caused to engage the latch 23 and the electric current will traverse the wire 25 thus illuminating the light marked "L" to indicate that the vehicle is to turn to the left.

From this it will be noted that when the steering shaft is turned to the right or left a direction indicating device will be illuminated automatically, provided, as hereinbefore stated, the electric circuit is complete, but in order that this operation shall not be effected each time the steering shaft is turned to a slight degree and not sufficient for an indication of a turning movement, I have provided means to complete the electric circuit only by a special operation, and this usually depending upon some action, other than the operation of the steering gear, taking place preparatory to such turning movement.

This "setting mechanism" comprises a switch located in a case 27 and including a switch bar 28 pivotally mounted in the case and resting against fulcrum stops 29 located near opposite ends of the bar, this bar being connected by a wire 30 with a source of electric energy, as a battery 31, one pole of which is grounded on the frame of the vehicle. The bar 28 is operated by means of a cord or similar connection 32 extending from the bar to a clutch lever 37, and as shown in Figure 1. Contacts 33—34 are mounted in the case 27, the contact 34 being connected to the wire 17, and the contact 33 being connected by a wire 35 with the terminal of a stop light located in the case 26. A spring 36 holds said bar against its stops.

From this it will be noted that when the clutch lever 37 is depressed the cord 32 will pull the bar 28 that, swinging on a fulcrum 29, will be thus moved against the contact 34 thus establishing a circuit from the battery through the wire 30, the bar 28, contact 34 and wire 17 to the structure comprising the hooks 19 and 22 and from thence by wire 18 to the controller or magnet 11. The magnet being thus energized by reason of one pole thereof being grounded, the actuator 16 will hug the pillar 7, and if the pillar or shaft 7 now be turned, as for directing the vehicle to the right or left, the light indicating such turning movement will be illuminated, depending upon which way the shaft is turned, as hereinbefore described. Customarily, before making a turn, the clutch will be released to a certain extent to ease the movement of the vehicle around a corner, and this operation will automatically "set" the switch mechanism.

When the brake is applied to stop the movement of the vehicle the brake lever 9 is depressed and this movement pulls upon a cord 38 connecting the brake lever with the bar 28, with a result that one end of the bar is engaged with the contact 33 thus establishing a connection from the battery 31 through the wire 30, contact 33 and wire 35, thus illuminating the stop light. This result will be effected even though the clutch lever may be depressed at the same time, as current will then flow both to the direction indicating and stop lights.

The mechanism described herein and embodying applicant's invention provides a direction signal control which is normally out of operative connection with the steering mechanism and for this reason is not affected by the actuation of any portion of the mechanism due to the ground engaging steering wheels meeting with irregularities or obstructions in the road which are constantly transmitted to the steering mechanism causing a rocking movement of the steering shaft in the opposite directions. This is a distinct advantage in that the indicating mechanism is operated only when required and by a positive action required to perform some distinct function in the operation of the vehicle.

In accordance with the provisions of the patent statutes I have described the principles of operation of my invention, together with the device which I now consider to represent the best embodiment thereof, but I desire to have it understood that the device shown is only illustrative and that the invention may be carried out by other means and applied to uses other than those above set out.

I claim—

1. In combination, a plurality of open circuits, indicating means connected in one of said circuits, a switch mechanism operative to close one of said circuits and to partially close another of said circuits, a vehicle control pedal connected to said switch mechanism for operating the same, a second switch mechanism operative to complete the closing of the partially closed circuit, a movable vehicle steering member, and electrical means connected in the circuit closed by the first switch mechanism and operable to connect the second switch mechanism to the movable steering member so that movement of the latter will actuate the second switch mechanism.

2. In combination, a plurality of open circuits, indicating means connected in one of said circuits, a switch mechanism operative to simultaneously close one of said circuits and to partially close another of said circuits, a vehicle control pedal connected to said switch mechanism, a second switch mechanism operative to complete the closing of the partially closed circuits, a movable vehicle steering member, and electrical means connected in the circuit closed by the first switch mechanism and operable to connect the second switch mechanism to the movable vehicle steering member so that different movements of the latter will actuate the second switch mechanism to close either of said partially closed circuits.

3. In combination, a plurality of open circuits, indicating means in one of said circuits, a switch mechanism operative to close one of said circuits with an indicating means therein and the circuit without any indicating means and to partially close another of said circuits with indicating means therein, vehicle control pedals for operating said switch mechanism, a second switch mechanism operative to complete the closing of the partially closed circuits, a movable vehicle steering member, and electro-magnetic means connected in the second mentioned circuit closed by the first switch mechanism and operable to connect the second switch mechanism to the movable vehicle steering member so that different movements of the latter will actuate the second switch mechanism to close either of said partially closed circuits.

4. In combination, a plurality of open circuits, indicating means in one of said circuits, a switch mechanism operative to close one of said circuits with an indicating means therein and the circuit without any indicating means and to partially close another of said circuits with indicating means therein, a vehicle control pedal for operating the switch mechanism to cause the latter to perform all of the above stated functions, a second vehicle control pedal for operating the switch mechanism to cause the latter to close the circuit without an indicating means and to partially close said circuits with indicating means, a second switch mechanism operative to complete the closing of the partially closed circuits, a movable vehicle steering member, and electro-magnetic means connected in the second mentioned circuit closed by the first switch mechanism and operable to connect the second switch mechanism to the movable vehicle steering member so that different movements of the latter will actuate the second switch mechanism to close either of said partially closed circuits.

5. In combination, a plurality of open circuits, indicating means connected in one of said circuits, a switch mechanism operative to simultaneously close said one circuit and to partially close another of said circuits, a pedal control for the vehicle connected to the switch mechanism for operating the latter, a second switch mechanism operative to complete the closing of the partially closed circuits, a steering shaft, and electro-magnetic means connected to the circuit closed by the first mentioned switch mechanism and operative when energized to connect the second switch mechanism to the steering shaft so that angular movement of the latter in opposite directions will actuate the second switch mechanism for closing said partially closed circuits.

6. In combination, a plurality of open circuits, indicating means in one of said circuits, a switch mechanism operative to close one of said circuits with an indicating means therein and the circuit without an indicating means and to partially close another of said circuits with indicating means therein, pedal controls for operating said switch mechanism, a second switch mechanism operative to complete the closing of the partially closed circuits, a steering shaft, and electro-magnetic means connected to the circuit closed by the first mentioned switch mechanism and operative when energized to connect the second switch mechanism to the steering shaft so that angular movement of the latter in opposite directions will actuate the second switch mechanism for closing said partially closed circuits.

7. In combination, a plurality of open circuits, indicating means in one of said circuits, a switch mechanism operative to close one of said circuits with an indicating means therein and the circuit without any indicating means and to partially close another of said circuits with indicating means, a pedal control member for operating the switch mechanism to cause the latter to perform all of its above stated functions, a second pedal control for operating the switch mechanism to cause the latter to close the circuit without an indicating means and to partially close said circuits with indicating means, a second switch mechanism operative to complete the closing of the partially closed circuits, a movable vehicle control member, and electro-magnetic means connected in the second mentioned circuit closed by the first switch mechanism and operable to connect the second switch mechanism to the movable vehicle control so that different movements of the latter will actuate the second switch mechanism to close either of said partially closed circuits.

8. In combination, a plurality of open circuits, indicating means in one of said circuits, a switch mechanism operative to close one of said circuits with an indicating means therein and the circuit without an indicating means and to partially close another of said circuits with indicating means, a pedal vehicle control for operating the switch mechanism to cause the latter to simultaneously perform all of its above stated functions, a second switch mechanism operative to complete the closing of the partially closed circuits, a steering shaft, and electro-magnetic means connected to the circuit closed by the first mentioned switch mechanism and operative when energized to connect the second switch mechanism to the steering shaft so that angular movement of the latter in opposite directions will actuate the second switch mechanism for closing said partially closed circuits.

9. In combination, a plurality of open circuits, indicating means connected in one of said circuits, a switch mechanism operative to simultaneously close said one circuit and to partially close another of said circuits, a pedal control for the vehicle connected to the switch mechanism for operating the latter, a second switch mechanism operative to complete the closing of the partially closed circuits and including a pair of spaced contacts and a pivotally mounted blade adapted to move into engagement with either of said contacts, a steering shaft, and electro-magnetic means connected to the circuit closed by the first mentioned switch mechanism and operative when energized to connect the blade of the second switch mechanism to the steering shaft so that angular movement of the latter in opposite directions will actuate the second switch mechanism for closing said partially closed circuits.

10. In combination, a plurality of open circuits, indicating means connected in one of said circuits, a switch mechanism operative to close one of said circuits and to partially close another of said circuits, a vehicle control member connected to said switch mechanism for operating the same, a second switch mechanism operative to complete the closing of the partially closed circuit, a movable vehicle control member, and electrical means connected in the circuit closed by the first switch mechanism and operable to connect the second switch mechanism to the movable vehicle control so that movement of the latter will actuate the second switch mechanism, said electrical means including a magnet comprised in the second switch mechanism and attracted to the vehicle control member to which it adheres when energized.

11. In combination, a plurality of open circuits, indicating means in one of said circuits, a switch mechanism operative to close one of said circuits with an indicating means therein and the circuit without an indicating means and to partially close the remaining circuits with indicating means, vehicle control pedals for operating said switch mechanism, a second switch mechanism operative to complete the closing of the partially closed circuits, said last switch mechanism including a plurality of spaced contacts connected individually to said circuits having indicating means, a pivotally mounted frame, contact members carried by the frame and adapted to engage said spaced contacts upon pivotal movement of the frame, a movable vehicle steering member, and electro-magnetic means connected in the second mentioned circuit closed by the first switch mechanism and operable to connect the second switch mechanism to the movable vehicle steering member so that different movements of the latter will actuate the second switch mechanism to close either of said partially closed circuits.

12. In combination, a plurality of open circuits, indicating means in one of said circuits, a switch mechanism operative to close one of said circuits with an indicating means therein and the circuit without an indicating means and to partially close the remaining circuits with indicating means, vehicle control pedals for operating said switch mechanism, a second switch mechanism operative to complete the closing of the partially closed circuits, said last switch mechanism including a plurality of spaced contacts connected individually to said circuits having indicating means, a pivotally mounted frame, contact members carried by the frame and adapted to engage said spaced contacts upon pivotal movement of the frame, a vehicle steering shaft, and a magnet mounted on said frame and having a core attracted to the shaft and adhering thereto to connect the frame to the shaft so that movement of the latter will actuate the second switch mechanism to close either of said partially closed circuits.

13. In combination, a plurality of open circuits, indicating means connected in one of said circuits, a switch mechanism operative to simultaneously close said one circuit and to partially close another of said circuits, a pedal control for the vehicle connected to the switch mechanism for operating the latter, a second switch mechanism operative to complete the closing of the partially closed circuits, said last switch mechanism including a plurality of spaced contacts connected individually to said circuits having indicating means, a pivotally mounted frame, contact members carried by the frame and adapted to engage said spaced contacts upon pivotal movement of the frame, a vehicle steering shaft, and a magnet mounted on said frame and having a core attracted to the shaft and adhering thereto to connect the frame to the shaft so that movement of the latter will actuate the second switch mechanism to close either of said partially closed circuits.

14. In combination, a plurality of open circuits, indicating means in one of said circuits, a switch mechanism operative to close one of said circuits with an indicating means therein and the circuit without any indicating means and to partially close the remaining circuits with indicating means therein, a vehicle control pedal for operating the switch mechanism to cause the latter to perform all of its above stated functions, a second vehicle control pedal for operating the switch mechanism to cause the later to close the circuit without an indicating means and to partially close said circuits with indicating means, a second switch mechanism operative to complete the closing of the partially closed circuits, said last switch mechanism including a plurality of spaced contacts connected individually in said circuits having indicating means, a pivotally mounted frame, contact members carried by the frame and adapted to engage said spaced contacts upon pivotal movement of the frame, a vehicle steering shaft, and a magnet mounted on said frame and having a core attracted to the shaft and adhering thereto to connect the frame to the shaft so that movement of the latter will actuate the second switch mechanism to close either of said partially closed circuits.

EDWARD SCHILKE.